US011822315B2

United States Patent
Kang

(10) Patent No.: US 11,822,315 B2
(45) Date of Patent: Nov. 21, 2023

(54) DEVICE AND METHOD FOR INTERLINKING CONVENTIONAL FIELDBUS-BASED AUTOMATIC CONTROL SYSTEM WITH IOT

(71) Applicant: ILPUM CORP., Gunpo-si (KR)

(72) Inventor: Zeajong Kang, Gangwon-do (KR)

(73) Assignee: ILPUM CORP., Gunpo-si (KR)

( * ) Notice: Subject to any disclaimer, the term of this patent is extended or adjusted under 35 U.S.C. 154(b) by 0 days.

(21) Appl. No.: 17/932,377

(22) Filed: Sep. 15, 2022

(65) Prior Publication Data

US 2023/0004145 A1    Jan. 5, 2023

Related U.S. Application Data

(63) Continuation of application No. PCT/KR2021/006576, filed on May 27, 2021.

(30) Foreign Application Priority Data

Jul. 14, 2020  (KR) .................. 10-2020-0086801
Dec. 14, 2020 (KR) .................. 10-2020-0174161

(51) Int. Cl.
*G05B 19/41* (2006.01)
*G05B 19/4155* (2006.01)

(52) U.S. Cl.
CPC .......... *G05B 19/4155* (2013.01); *G05B 2219/31135* (2013.01)

(58) Field of Classification Search
CPC .............. G05B 19/042; G05B 2219/31135
See application file for complete search history.

(56) References Cited

U.S. PATENT DOCUMENTS 11,223,513 B2 * 1/2022 Ilochonwu ............ H04L 41/145
11,316,800 B2 * 4/2022 Liu ........................ G06F 9/455
(Continued)

FOREIGN PATENT DOCUMENTS

JP       2020-518921 A     6/2020
KR    10-2019-0123915 A    11/2019
(Continued)

OTHER PUBLICATIONS

International Search Report issued in PCT/KR2021/006576; dated Sep. 1, 2021.

*Primary Examiner* — Henry Tsai
*Assistant Examiner* — Christopher A Daley
(74) *Attorney, Agent, or Firm* — Studebaker & Brackett PC

(57) ABSTRACT

A device and a method for interlinking conventional fieldbus-based automatic control system with IoT at a subordinate position are provided. According to the present disclosure, the interlinking system device comprise a fieldbus connection unit connected to an operation device based on a fieldbus protocol and configured to operate as an input-output device, a fieldbus virtual input-output memory configured to memorize input-output information exchanged with the operation device, an IoT connection unit connected to an IoT platform based on an IoT protocol and configured to operate as an IoT device, a message formation unit configured to apply message metadata received from the IoT platform via the IoT connection unit and a message processing unit configured to process an input-output message based on the message metadata and the input-output information.

11 Claims, 7 Drawing Sheets

(56) References Cited

U.S. PATENT DOCUMENTS

| | | | |
|---|---|---|---|
| 11,501,881 B2* | 11/2022 | Patil | G06K 19/06037 |
| 11,635,990 B2* | 4/2023 | Singh | G06F 9/5011 |
| | | | 718/104 |
| 2018/0321662 A1* | 11/2018 | Nixon | G06F 13/4226 |
| 2019/0123959 A1* | 4/2019 | Joshi | H04L 67/34 |
| 2022/0147336 A1* | 5/2022 | Joshi | H04L 41/082 |

FOREIGN PATENT DOCUMENTS

| | | |
|---|---|---|
| KR | 10-2211876 B1 | 2/2021 |
| WO | 2019/099111 A1 | 5/2019 |

* cited by examiner

DEVICE AND METHOD FOR INTERLINKING CONVENTIONAL FIELDBUS-BASED AUTOMATIC CONTROL SYSTEM WITH IOT

CROSS REFERENCE TO RELATED APPLICATIONS AND CLAIM OF PRIORITY

This application is a Continuation of International Application No. PCT/KR2021/006576, filed May 27, 2021, which claims benefit of priority to Korean Patent Application No. 10-2020-0086801 filed Jul. 14, 2020 and Korean Patent Application No. 10-2020-0174161 filed Dec. 14, 2020, the disclosure of which are incorporated herein by reference in their entirety

BACKGROUND

1. Technical Field

The present disclosure relates to a device and method for interlinking a conventional automatic control system with an Internet of things (IOT), and more particularly, to an interlinking device that operates as a subordinate position device in both a conventional fieldbus-based automatic control system and an IoT system, and a method to interlink the automatic control system with the IoT system via a virtual input and output of the interlinking device.

2. Description of the Related Art

An Internet of Things (IoT) is a conceptual expression shared by the public as a way or technology for things to be connected to the Internet. In the present disclosure, an IoT system is defined as having the IoT built in for general users. The IoT system consists of an IoT protocol, an IoT device configured to exchange information on sensors and actuators based on the IoT protocol and an IoT platform configured to integrate and manage information of the IoT device and to provide users with status monitoring and setting change functions of the IoT device. The IoT platform and the IoT device have a relationship between supervisors and subordinates, and FIG. 1 is a schematic view thereof. A message is used for information exchange between the IoT device and the IoT platform, and input-output messages are exchanged to read input information and write output information. In order for the IoT system to recognize input-output information of the IoT device, the IoT system's integrator has to register message metadata that define the input-output messages of the IoT device on the IoT platform.

An automatic control system is a system for automatically controlling an input value of a control target so that an output value of the control target coincides with a preset target value. The automatic control system consists of a fieldbus protocol, an input-output device configured to exchange the information on sensors and actuators based on the fieldbus protocol, and an operation device configured to integrate and manage information of the input-output device and provide the user with status monitoring and setting change functions of the input-output device. The operation device and the input-output device have a relationship between supervisors and subordinates, and FIG. 2 is a schematic view thereof.

FIG. 3 is a use example of a conventional automatic control system. In conventional automatic control systems built before the concept of the IoT was generally established and its standard was determined, the user monitors and manages the input-output device through supervisory control and data acquisition (SCADA). To this end, the integrator of the automatic control system has to code the tasks of the SCADA, configure a user interface (UI), and code the tasks of the operation device. In the case of interlinking a plurality of automatic control systems, a way of placing wide-area SCADA in the superior position of the conventional SCADA is used. In typical automatic control systems, the SCADA may be included in the automatic control system as necessary, or may replace the function of the operation device. The operation device may further include the function of the input-output device in addition to the function of operating the automatic control system. The input-output device may be a device that processes a digital input (DI), a digital output (DO), an analog input (AI), an analog output (AO), and a unique input or output information. Actual input information and output information are represented as electrical signals such as voltage, current, and resistance. When the input-output device is the DI, collected input information is obtained from an external DO or an on-off type sensor. When the input-output device is the DO, the output information is transmitted to an external DI or an on-off type actuator. When the input-output device is the AI, collected input information is obtained from an external AO or a multi-level type of sensor. When the input-output device is the AO, the output information is transmitted to an external AI or a multi-level type of actuator. The input-output device may process a plurality of complex input and output information.

FIG. 4 is a use example of the IoT system. The user of the IoT system monitors and manages the IoT device by accessing the IoT platform via a web or an app. To this end, the integrator of the IoT system registers the input-output information of the IoT device on the IoT platform and configures the UI. In typical IoT devices, since their input and output are physically determined, message metadata have been fixed, and only data can be changed on a level excluding message metadata for unused input and output information.

FIG. 5 is three use cases for interlinking the IoT system with the conventional automatic control system using the conventional IoT technology. Similarly to the method for interlinking a plurality of automatic control systems, a method for placing a gateway on the top of the conventional automatic control system is applied to the use cases. The gateway should play a basic role in conforming the fieldbus protocol to the IoT protocol and conforming different information management systems for each SCADA manufacturer to an IoT information management system. Furthermore, according to the configuration of the automatic control system shown in the use cases, the gateway has to act as the operation device, the SCADA or the wide-area SCADA. When the gateway performs a complex function, it is referred to as an edge or a fog. When the gateway is entered between the IoT system and the automatic control system, the integrator has to perform gateway protocol confirming, information management system confirming, task coding, UI configuration, and so forth. Therefore, there is a problem that the integrator needs to have plenty of knowledge to interlink the IoT system with the conventional automatic control system using the gateway, and the interlinking method is also complicated.

SUMMARY

Aspects of the present disclosure for solving the problems provide an interlinking device and an interlinking method for simplifying a construction task by minimizing knowledge that an integrator needs to acquire in order to interlink a conventional fieldbus-based automatic control system with an IoT system.

According to the present disclosure, an interlinking device for automatic control system and IoT system that exists at a subordinate position of the IoT platform, and simultaneously exists at a subordinate position of the operation device is provided. The interlinking device may comprise a fieldbus connection unit connected to an operation device based on a fieldbus protocol and configured to operate as an input-output device, a fieldbus virtual input-output memory configured to memorize input-output information exchanged with the operation device, an IoT connection unit connected to an IoT platform based on an IoT protocol and configured to operate as an IoT device, a message formation unit configured to apply message metadata received from the IoT platform via the IoT connection unit and a message processing unit configured to process an input-output message based on the message metadata and the input-output information. More specifically, the message metadata may further comprise an address of the fieldbus virtual input-output memory. The interlinking device is applied to interlinking of an automatic control system connected based on a conventional fieldbus protocol and an IoT system connected over an Ethernet communication network over by an IoT protocol or connected via a LPWA communication network.

According to the present disclosure, a method for interlinking an automatic system with an IoT system that can form a variable input-output message based on fieldbus virtual input-output memory address which is comprised in message metadata is provided. The method may comprise a message forming step of receiving and applying message metadata further including an address of a fieldbus virtual input-output memory from an IoT platform and a message processing step of processing an input-output message based on the message metadata and input-output information of the fieldbus virtual input-output memory. More specifically, the message processing step for interlinking an input message of the input-output message with output information of the input-output information, may comprise recognizing, by a message processing unit, a change in the message metadata and setting output information to be monitored, based on the address of the output information interlinked with the input message included in the message metadata and generating, by the message processing unit, the input message based on the message metadata and transmitting the input message to the IoT platform, when detecting a situation to be reported to the IoT platform from the output information to be monitored. More specifically, the message processing step for interlinking an output message of the input-output message with input information of the input-output information may comprise updating, by the message processor, the input information based on the address of the input information interlinked with the output message included in the message metadata. The interlinking method provides an input-output message interlinking when interlinkable input-output information is fixed as well as when it is added/deleted/changed; it also provides not only input-output message interworking formed with only input or output information, but also input-output message interlinking formed with complex input-output information.

In order to interlink a conventional automatic control system to which an IoT technology is not applied with an IoT system using an interlinking device and an interlinking method of the present disclosure, the integrator of the interlinking device only installs the interlinking device and connects both communication networks. The actual interlinking process is performed by the integrator of the automatic control system and the integrator of the IoT system, and only the integrator of the IoT system needs to learn knowledge to handle, based on addresses, input-output information disposed in a fieldbus virtual input-output memory inside the interlinking device. Accordingly, the present disclosure has the advantage of simplifying the integrator's task as compared to the interlinking using a gateway.

DETAILED DESCRIPTION

Figure 1:
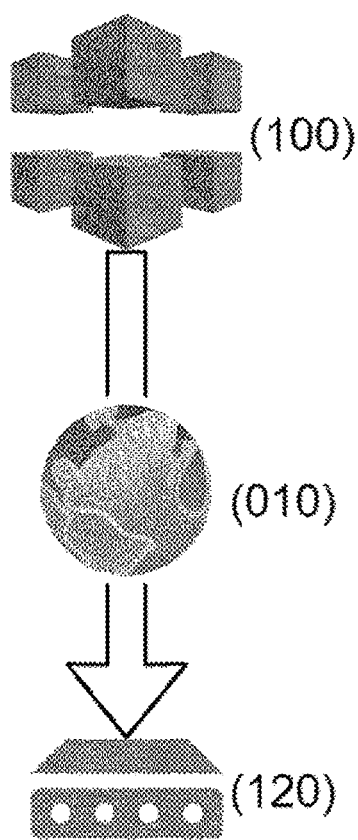
FIG. 1 is a schematic view illustrating a relationship between an IoT platform and an IoT device in an IoT system.
Figure 2:
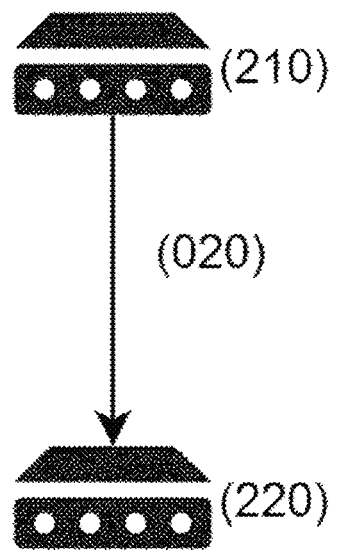
FIG. 2 is a schematic view illustrating a relationship between an operation device and an input-output device in an automatic control system.
Figure 3:
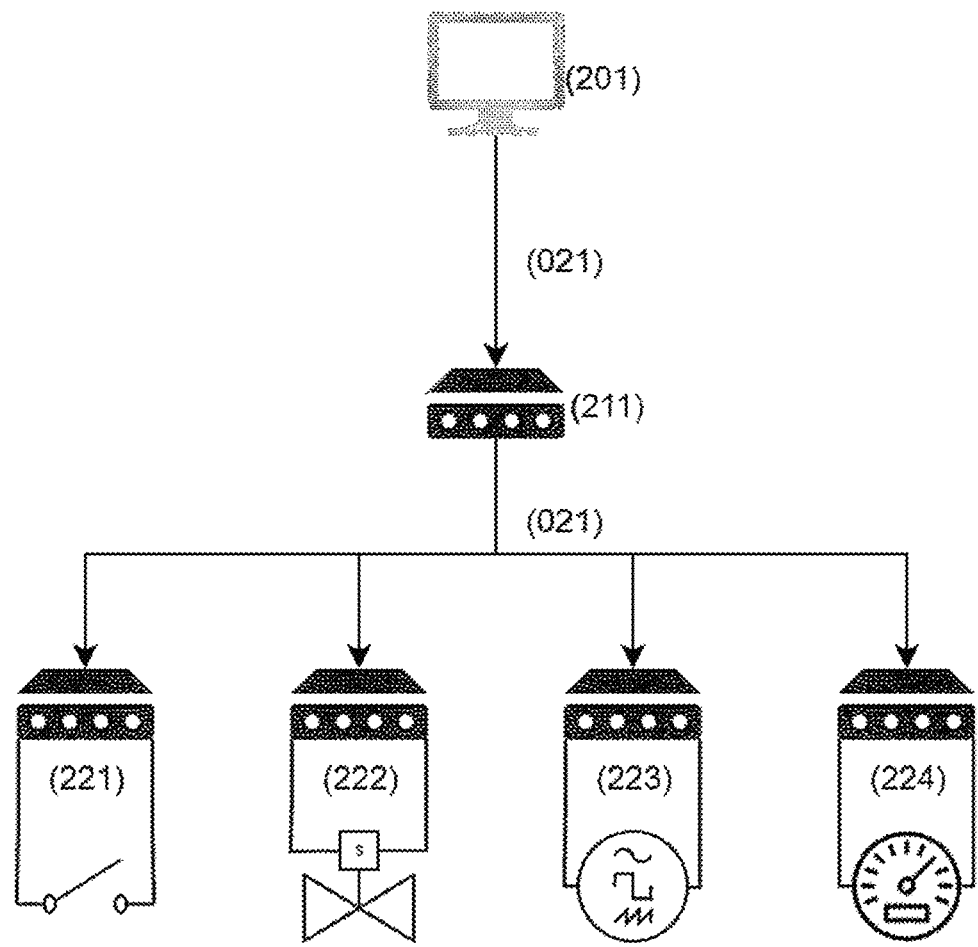
FIG. 3 is a block diagram illustrating an example of a conventional automatic control system including SCADA.
Figure 4:
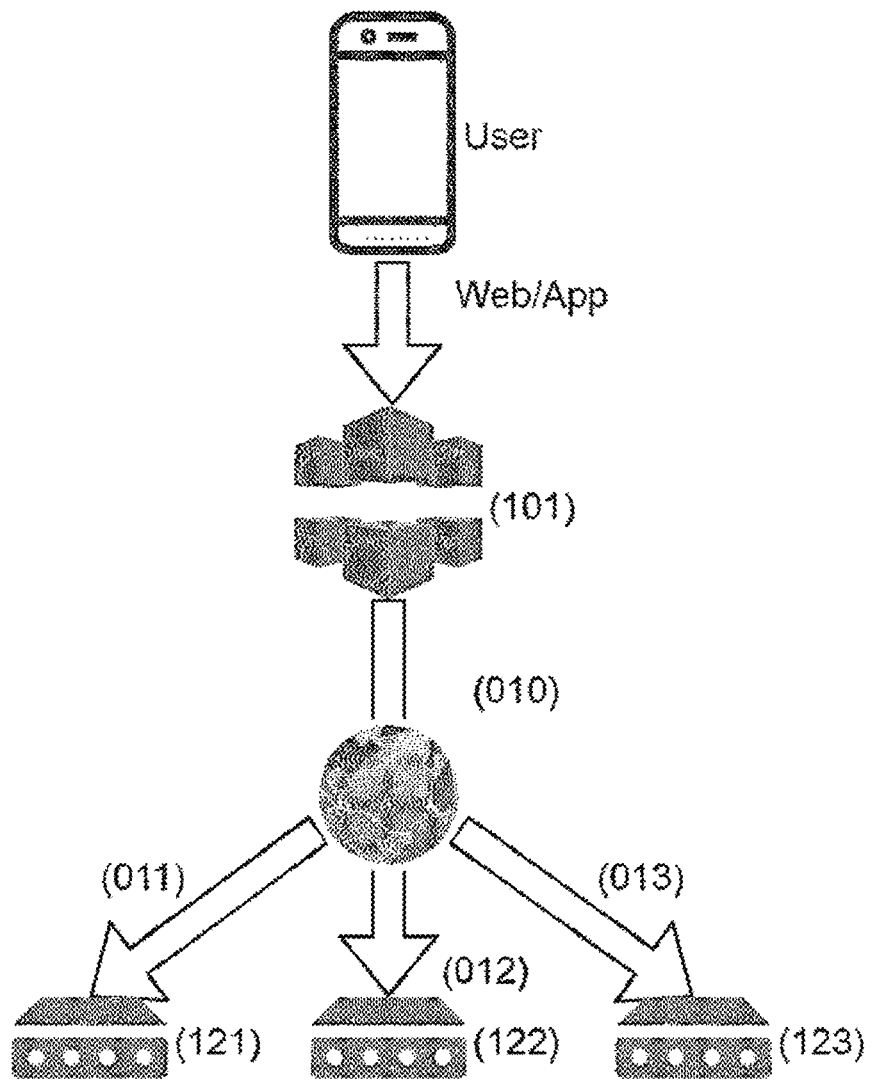
FIG. 4 is a block diagram illustrating an example of an IoT system consisting only of an IoT device.
Figure 5:
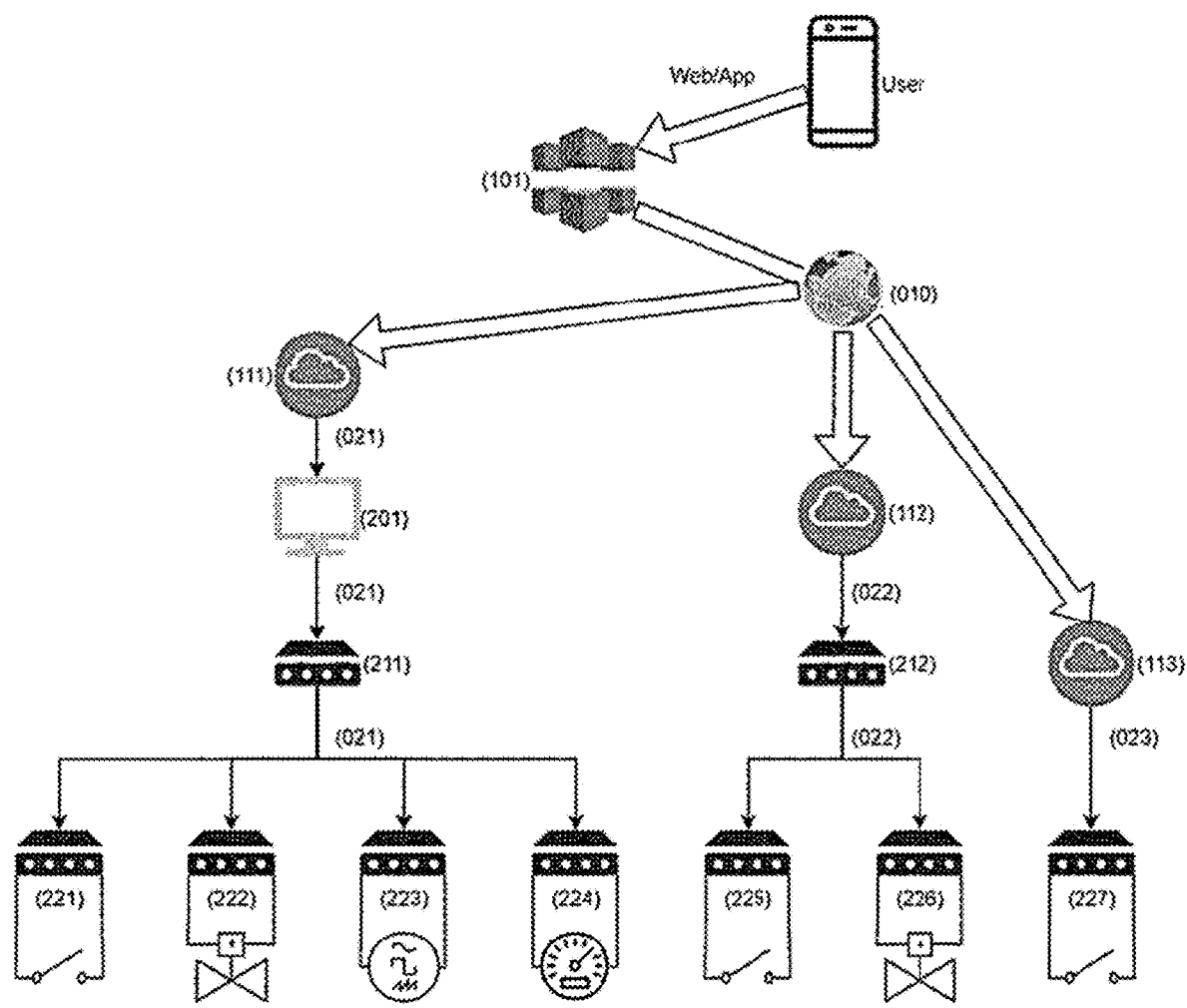
FIG. 5 is a block diagram illustrating three examples of interlinking the IoT system with an automatic control system using a gateway.

While the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the prevent disclosure. Like reference numerals refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the prevent disclosure. As used herein, the singular forms are intended to include the plural forms as well, unless the context clearly indicates otherwise. It will be further understood that the terms "comprises" and/or "comprising" and "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, various embodiments of the present disclosure will be described with reference to the attached drawings.

As illustrated below, an interlinking device according to the present disclosure is included in an automatic control system as one of the input-output devices, and is included in an IoT system as one of the IoT devices. Therefore, the interlinking device exists at a subordinate position of the operation device, and simultaneously exists at a subordinate position of an IoT platform. In addition, the interlinking device according to the present disclosure includes a fieldbus connection unit connected to an automatic control system based on a fieldbus protocol, a fieldbus virtual input-output memory configured to store input-output information to be exchanged with the operation device, an IoT connection unit connected to the IoT platform of the IoT system based on an IoT protocol; a message formation unit configured to receive and apply message metadata from the IoT platform, and a message processing unit configured to process a message based on the message metadata and input-output information of a fieldbus virtual input-output memory. Further, the interlinking method according to the present disclosure simplifies the task to be performed by the integrator in an interlinking process by including addresses for each input-output information of the fieldbus virtual input-output memory in the message metadata.

The fieldbus protocol that can be used by the interlinking device according to the present disclosure may be included (or not included) in protocols such as IEC 61784, IEC 62026, ISO 11898, ISO 16484, ISO 11783, IEC 14543, IEC 14908, IEC 61375, ISO 11519, and so forth, and have individual names such as foundation fieldbus H1 (FF H1), FF high speed Ethernet (FF HSE), a common industrial protocol (CIP), ControlNet, DeviceNet, a process fieldbus (PROFIBUS), a process field net (PROFINET), a process network (P-NET), a world factory instrumentation protocol (WorldFIP), INTERBUS, a control & communication link (CC-Link), a highway addressable remote transducer protocol (HART), WirelessHART, a serial realtime communications system (SERCOS), MECHATROLINK, Vnet/IP, TCnet, an Ethernet for control automation technology (EtherCAT), an Ethernet POWERLINK, MODBUS RTU, MODBUS ASCII, MODBUS TCP, realtime automation protocols for industrial Ethernet (RAPIEnet), SafetyNET, ADS-net, FL-net, an actuator sensor interface (AS-i), a building automation and control system (BACS), a building automation and control network (BACnet), a control area network (CAN), CANopen, an installation bus (Instabus), ISOBUS, LonWorks, a train communication network (TCN), a multifunction vehicle bus (MVB), a wire train bus (WTB), a smart distributed system (SDS), a vehicle area network (VAN), and so forth.

The IoT protocol that can be used by the interlinking device according to the present disclosure include a hypertext transfer protocol (HTTP), HTTP secure (HTTPS), a message queuing telemetry transport (MQTT), MQTT secure (MQTTS), an advanced message queuing protocol (AMQP), a constrained application protocol (CoAP), and so forth, in the Ethernet network, and the expression of information uses eXtensible markup language (XML) and JavaScript object notification (JSON). When the interlinking device connects to the IoT platform via the Low Power, Wide Area (LPWA) communication network because it finds it difficult to connect directly to the Ethernet network, the IoT protocol uses Sigfox, LoRa, Weithtless, Wize, LTE-M, Telensa, Nwave, NB-Fi, MIoTy, LTE-Advanced, 5G, NB-ToT, Wi-SUN, DASH7, and so forth, and the expression of information uses a character string, a number string, or the like.

Figure 6:
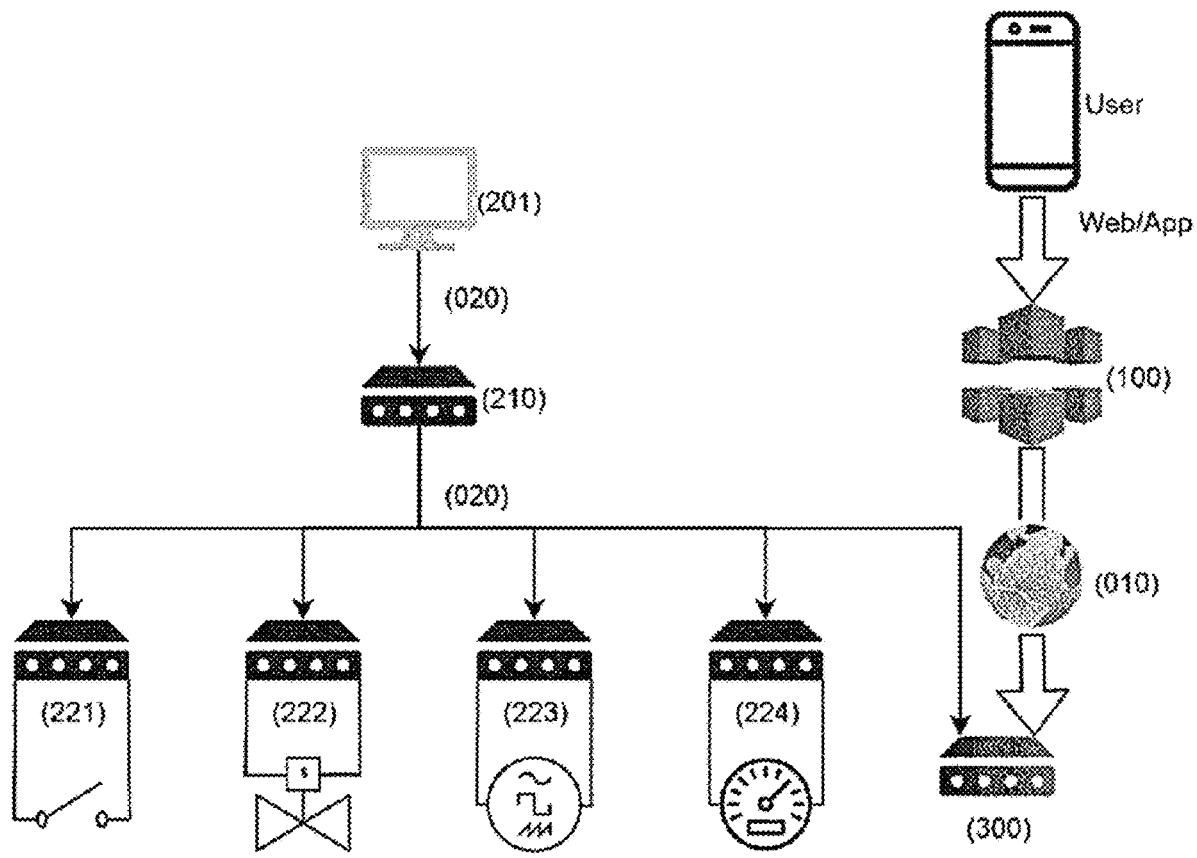
FIG. 6 is a block diagram illustrating interlinking between the IoT system and the automatic control system according to one embodiment of the present disclosure.

FIG. 6 illustrates interworking between the automatic control system and the IoT system according one an embodiment of the present disclosure.

Referring to FIG. 6, the interlinking device 300 according to one embodiment of the present disclosure is connected to other input-output devices 221, 222, 223 and 224 at a subordinate position of an operation device 210 based on the same fieldbus protocol 020. Since the configuration of such an automatic control system is general, a way for the integrator of the automatic control system to add the interlinking device does not significantly differ from a way to add the conventional input-output device. This has the advantage of simplifying the interlinking task of the integrator of the automatic control system on the level of daily tasks.

In addition, the interlinking device 300 according to one embodiment of the present disclosure is connected to a subordinate position of an IoT platform 100 based on an IoT protocol 010. Unlike a gateway with another device disposed in the subordinate position thereof in which the integrator needs to manage the device disposed in the subordinate position, the interlinking device 300 according to one embodiment of the present disclosure has the advantage of simplifying the interlinking process only with a task of adding a general IoT device.

Figure 7:
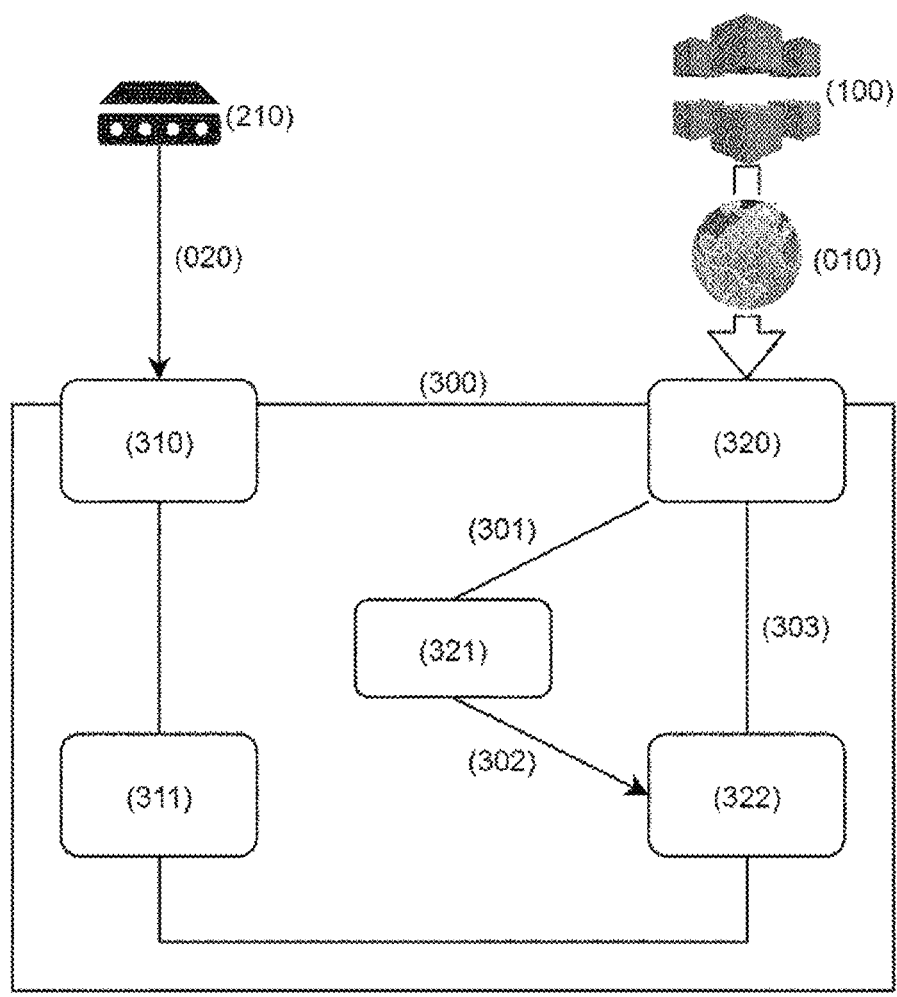
FIG. 7 is a block diagram illustrating the configuration of an interlinking device according to one embodiment of the present disclosure.

FIG. 7 illustrates the configuration of the interlinking device according to one embodiment of the present disclosure.

Referring to FIG. 7, the interlinking device 300 according to one embodiment of the present disclosure includes a fieldbus connection unit 310, a fieldbus virtual input-output memory 311, an IoT connection unit 320, a message formation unit 321 and a message processing unit 322. The interlinking method according to one embodiment of the present disclosure has the advantage that the integrator of the automatic control system can assign input-output information to be interlinked, to the fieldbus virtual input-output memory 311 and share an address and data for each input-output information to be assigned, with the integrator of the IoT; furthermore, the integrator of the IoT can also define an address of the input-output information in the message metadata to variably define the input-output message.

While the example embodiments of the present invention and their advantages have been described in detail, it should be understood that various changes, substitutions and alterations may be made herein without departing from the scope of the invention.

[Explanation of Reference Numerals]

(010) collectively referring to the IoT protocol (011), (012) and (013) IoT protocol applied to the IoT device in the constructed IoT system (020) collectively referring to the fieldbus protocol (021), (022) and (023) fieldbus protocol applied to the input-output device in the constructed automatic control systems (100) collectively referring to the IoT platform (101) IoT platform applied to the constructed IoT system (111) gateway disposed at the top of SCADA (112) gateway disposed at the top of the operation unit (113) gateway disposed at the top of the input-output device (120) collectively referring to the IoT device.

(121), (122) and (123) IoT device applied to the constructed IoT system (201) SCADA applied to the constructed automatic control system (210) collectively referring to the operation device (211) and (212) operation device applied to the constructed automatic control system (220) collectively referring to the input-output device (221), (225) and (227) digital input device applied to the constructed automatic control system (222) and (226) digital output device applied to the constructed automatic control system (223) analog input device applied to the constructed automatic control system (224) analog output device applied to the constructed automatic control system (300) interlinking device (301) message metadata (302) applied message metadata (303) input-output message (310) fieldbus connection unit (311) fieldbus virtual input-output memory (320) IoT connection unit (321) message formation unit (322) message processing unit

What is claimed is:

1. A device for interlinking an automatic control system with an IoT system, the device comprising:
   a fieldbus connection unit connected to the automatic control system based on a fieldbus protocol;
   a fieldbus virtual input-output memory configured to store input-output information to be interlinked;
   an IoT connection unit connected to the IoT system based on an IoT protocol; and
   a message processing unit configured to process an input-output message based on message metadata received from the IoT system via the IoT connection unit and the input-output information stored in the fieldbus virtual input-output memory,
   wherein the message metadata comprises an address of the fieldbus virtual input-output memory for each of the input-output information to be interlinked.

2. The device for interlinking an automatic control system with an IoT system of claim 1, wherein the fieldbus protocol is at least one of IEC 61784, IEC 62026, ISO 11898, ISO 16484, ISO 11783, IEC 14543, IEC 14908, IEC 61375, ISO 11519, FF H1, FF HSE, CIP, ControlNet, DeviceNet, PROFIBUS, PROFINET, P-NET, WorldFIP, INTERBUS, CC-Link, HART, WirelessHART, SERCOS, MECHATROLINK, Vnet/IP, TCnet, EtherCAT, Ethernet POWERLINK, MODBUS RTU, MODBUS ASCII, MODBUS TCP, RAPIEnet, SafetyNET, ADS-net, FL-net, AS-i, BACS, BACnet, CAN, CANopen, Instabus, ISOBUS, LonWorks, TCN, MVB, WTB, SDS, and VAN.

3. The device for interlinking an automatic control system with an IoT system of claim 1, wherein the IoT protocol is at least one of HTTP, HTTPS, MQTT, MQTTS, AMQP, and CoAP.

4. The device for interlinking an automatic control system with an IoT system of claim 1, wherein the IoT connection unit is connected to the IoT system via a low power wide area (LPWA) communication network, and
   the IoT protocol is one of Sigfox, LoRa, Weithtless, Wize, LTE-M, Telensa, Nwave, NB-Fi, MIoTy, LTE-Advanced, 5G, NB-ToT, Wi-SUN, and DASH7.

5. The device for interlinking an automatic control system with an IoT system of claim 1, further comprising: a message formation unit configured to extract application target message metadata by verifying the message metadata received from the IoT system via the IoT connection unit by using the address of the fieldbus virtual input-output memory for each of the input-output information to be interlinked, included in the message metadata.

6. The device for interlinking an automatic control system with an IoT system of claim 1, wherein the message processing unit is configured to,
   recognize a change in the message metadata, and set output information to be monitored, based on the address of the output information interlinked with an input message included in the message metadata,
   when detecting a situation to be reported to the IoT system in the output information to be monitored, generate the input message based on the message metadata and transmit the input message to the IoT system, and
   interlink an input message of the input-output message with output information of the input-output information.

7. The device for interlinking an automatic control system with an IoT system of claim 1, wherein the message processing unit is configured to,
   update an input information based on the address of the input information interlinked with an output message included in the message metadata, and interlink an input message of the input-output message with output information of the input-output information.

8. A method for interlinking an automatic control system with an IoT system, performed by a device for interlinking an automatic control system with an IoT system, the method comprising:
   receiving message metadata from an IoT system and forming an input-output message using the received message metadata; and
   processing the formed input-output message based on the received message metadata and input-output information to be interlinked, stored in a fieldbus virtual input-output memory of the interlinking device,
   wherein the message metadata comprises an address of the fieldbus virtual input-output memory for each of the input-output information to be interlinked.

9. The method for interlinking an automatic control system with an IoT system of claim 8, wherein the forming an input-output message comprises:
   extracting application target message metadata by verifying the message metadata based on the address of the fieldbus virtual input-output memory for each of the input-output information to be interlinked, included in the message metadata.

10. The method for interlinking an automatic control system with an IoT system of claim 8, wherein the processing the formed input-output message comprises:

interlinking an input message of the input-output message with output information of the input-output information, wherein the interlinking an input message of the input-output message with output information of the input-output information comprises:

recognizing a change in the message metadata, and setting output information to be monitored, based on the address of the output information interlinked with the input message included in the message metadata; and when detecting a situation to be reported to the IoT system in the output information to be monitored, generating the input message based on the message metadata and transmitting the input message to the IoT system.

11. The method for interlinking an automatic control system with an IoT system of claim 8, wherein the processing the formed input-output message comprises:

interlinking an output message of the input-output message with input information of the input-output information, wherein the interlinking the output message of the input-output message with input information of the input-output information comprises:

updating the input information based on the address of the input information interlinked with the output message included in the message metadata.

\* \* \* \* \*